United States Patent [19]

Walsh

[11] 4,162,997
[45] Jul. 31, 1979

[54] HEAT-FUSIBLE PASTES FOR PRINTING INKS, ADHESIVES AND MOLDINGS

[75] Inventor: Robert M. Walsh, Wilmington, Del.

[73] Assignee: Hercules Incorporated, Wilmington, Del.

[21] Appl. No.: 882,847

[22] Filed: Mar. 2, 1978

[51] Int. Cl.² .................. C08L 91/00; C08L 93/04
[52] U.S. Cl. .......................... 260/27 R; 8/2;
 8/62; 260/22 CB; 260/23 P; 260/23 S; 260/25;
 260/33.6 R; 260/33.6 UA; 260/37 R; 260/42;
 260/42.54
[58] Field of Search ............... 260/27 R, 901, 22 C,
 260/22 B, 23 P, 874, 33.6 R, 23.5, 42.54, 25;
 526/909

[56] References Cited

U.S. PATENT DOCUMENTS

| | | | |
|---|---|---|---|
| 2,211,689 | 8/1940 | Dittmar | 260/901 |
| 2,413,259 | 12/1946 | Soday | 260/901 |
| 2,964,483 | 12/1960 | Johnson et al. | 260/22 CQ |
| 3,024,213 | 3/1962 | Ludlow | 260/23 AR |
| 3,380,938 | 4/1968 | Jack et al. | 260/901 |
| 3,427,269 | 2/1969 | Davis et al. | 260/27 |
| 3,445,544 | 5/1969 | Schmitt | 260/901 |
| 3,532,654 | 10/1970 | Finn et al. | 260/27 R |
| 3,760,724 | 9/1973 | Budzinski et al. | 260/31.8 H |
| 3,814,740 | 6/1974 | Miller | 526/909 |
| 3,838,079 | 9/1974 | Kosaka et al. | 260/27 R |
| 3,862,068 | 1/1975 | Russell | 260/27 R |
| 3,932,328 | 1/1976 | Korpmann | 260/27 R |
| 4,045,517 | 8/1977 | Guerin et al. | 260/901 |

Primary Examiner—H. S. Cockeram
Attorney, Agent, or Firm—Marion C. Staves

[57] ABSTRACT

It has been discovered that pastes of particulate thermoplastic polymers dispersed in a soft resinous phase can be prepared which heat-set by fusion of the thermoplastic binder. Polystyrene-type and polyacrylate-type polymers have been found to be particularly useful. When pigmented or otherwise colored, these formulations have utility as printing inks. When uncolored, they can be used as clear overprint coatings. In addition, these fusible pastes have utility as specialty coatings in adhesives and can be fabricated into self-supporting shapes.

17 Claims, No Drawings

HEAT-FUSIBLE PASTES FOR PRINTING INKS, ADHESIVES AND MOLDINGS

BACKGROUND OF THE INVENTION

Printing processes require that printing inks be both fluid and capable of subsequent ready conversion to a dry, smudge-resistant film once in place on paper or another substrate. One common type of printing ink consists primarily of a pigment and a binder which are suspended or dissolved in a volatile diluent. The binder serves the purpose of adhering the pigment to the printed substrate. The diluent must subsequently be removed by allowing it to evaporate either at room temperature, or for higher printing speeds, by heating. Large amounts of heat are needed to vaporize the ink diluent, which requires that substantial quantities of fuel be consumed. Since large volumes of air must be drawn over the drying ink film to remove the diluent vapor, frequently much heat is wasted. Further, the evaporation of the ink diluent into the open atmosphere can be a source of pollution. In many instances, it is necessary or desirable to burn off or otherwise remove the solvent vapor from the drying air before discharging it to the atmosphere. Additional fuel is consumed and special equipment must be installed for this purpose.

A second common type of printing ink consists of mixtures containing oleoresinous varnishes and/or drying oils which set by air oxidation. These inks set slowly so it is necessary to take precautions to avoid set-off (transfer) of ink between printed sheets.

Inks may also be formulated which contain drying oils or the like together with some binder and volatile diluent. In the usual printing operation, heat is applied to such an ink immediately after it is printed onto the substrate. At this stage, the diluent is driven off, reducing or minimizing problems of ink set-off. However, the ink is not fully set and rub resistance is inadequate. A subsequent drying stage is necessary in which the drying oil or the like hardens, as by oxidation and/or polymerization.

While it is necessary that a printing ink set rapidly and conveniently after printing, it is equally necessary that it not set or dry on the press. Inks containing volatile components may thicken on the press as the solvent evaporates, making it difficult or impossible to control the printing process. Air oxidizing varnishes, drying oils, and the like, may thicken or gum on the press on exposure to the atmosphere. Such inks are especially inclined to "skin over" when the press is shut down during a run. An ink which is not subject to such changes while on the printing press is said to "stay open".

Ink technologists have sought to achieve inks which set rapidly with a low level of energy input to initiate setting, which do not release polluting materials to the atmosphere, and which stay open on the press, while at the same time meeting the physical and mechanical requirements of the printing process. Much attention has been directed to highly chemically reactive formulations. After printing, such inks are set by polymerization and/or cross-linking which is initiated by heat or radiation. A typical chemically reactive system contains polyfunctional acrylate esters (often in combination with other unsaturated materials), one or more ultraviolet photoinitiators, pigment and a variety of secondary components to control ink physical properties. See U.S. Pat. Nos. 3,804,640 and 3,881,942, both to Buckwalter.

In normal use, such inks are printed on presses equipped with ultraviolet lamps which expose the film on the paper or other substrate immediately after printing. The inks set rapidly and with essentially no emission of polluting materials. Inks based on such highly reactive materials, however, have limited storage stability. The acrylates and other reactive materials in common use have been found to be chemically incompatible with some pigments which are desirable in printing inks. They present toxicity hazards, or are dangerous eye irritants, and are frequently skin sensitizers. When the inks are designed to be set by an ultraviolet light initiated reaction, the ultraviolet radiation itself and the high voltages necessary to power the ultraviolet lamps are additional health and safety hazards.

U.S. Pat. No. 3,024,213 to Ludlow discloses a heat drying ink vehicle based on polyvinyl chloride plastisols, more particularly finely divided polyvinyl chloride polymer dispersed in liquid plasticizers, all of which have low viscosity and solubility parameters closely matched to polyvinyl chloride, and containing a compatible thermoplastic resinous binder to increase ink cohesion and tack. Further improvements in inks based on polyvinyl chloride and vinyl chloride copolymer plastisols are disclosed in U.S. Pat. No. 3,760,724 to Budzinski. These inks are set by applying heat which causes the liquid plasticizers and polyvinyl chloride or vinyl chloride copolymer to co-dissolve. Thus, such polyvinyl chloride plastisol-based inks are readily heat-settable without significant release of volatile materials to the atmosphere. These inks, however, do not have good press running characteristics. Undesirable build-up of material on the blanket of lithographic offset presses occurs when polyvinyl chloride plastisol inks are used. Further, both Ludlow and Budzinski require the use of at least one plasticizer in such polyvinyl chloride plastisol inks. Such plasticizers may, as Ludlow discloses, damage ordinary natural rubber rolls on printing presses. It is thus necessary that ink rolls of polyurethane rubber or other plasticizer resistant compositions be used.

SUMMARY OF THE INVENTION

The present invention provides nonvolatile, heat-set pastes. It has been discovered that pastes of particulate, glassy thermoplastic polymers dispersed in a soft resinous phase can be prepared which heat-set by the fusion of the glassy thermoplastic binder. When pigmented or otherwise colored, these formulations have utility as printing inks. When uncolored, they can be used as clear over-print coatings. In addition, these fusible pastes have utility as specialty coatings and adhesives and can be fabricated into self-supporting shapes.

DESCRIPTION OF THE PREFERRED EMBODIMENTS

According to this invention, nonvolatile, heat-set vehicles for printing inks can be made by dispersing particulate, glassy thermoplastic polymer binders in a soft resinous phase. More particularly, the printing ink vehicles of this invention contain particulate, glassy thermoplastic polymers dispersed in a tackifying, cohesion-increasing material which may be a resin or mixture of resins whose softening point is either at or below room temperature, or has been lowered by dilution with an oil.

The binder materials used in this invention comprise particulate, glassy thermoplastic polymers with a molecular weight above about 50,000 and a glass transition temperature above about 50° C. Suitable polymers may be based on one or more addition polymerizable monomers. Typical preferred polymers useful in this invention comprise polystyrene-type polymers or polyacrylate-type polymers.

While the particle size of the binder is not critical, for lithographic or letterpress inks particles about 0.05 to about 2.0 microns in cross-section are preferred, with particles of about 0.5 micron in cross-section being most preferable. Larger particles may give poor uniformity and press performance. In screen printing, much heavier ink films are printed so much larger particle sizes may be tolerated. The limit in particle size for inks used in screen printing is fixed by the mesh size of the printing screen and the thickness of the ink film desired. For use with coarse mesh screens and heavy ink films, particle sizes as high as about 50 microns can be used.

The polystyrene-type polymers used in the pastes of this invention are based on addition polymerizable monomers comprising styrene, alkyl-substituted styrene or other monovinylidene aromatic monomers, either alone or in combination with one or more comonomers, with at least 51% of the monomers being one or more of said styrene, alkyl-substituted styrenes or other monovinylidene aromatic monomers.

Thermoplastic polystyrene-type polymer particles of a size useful in this invention can be conveniently obtained by evaporating the water from dispersions prepared as described in U.S. Pat. No. 3,853,579 to Heiser. Alternatively, particles may be prepared by grinding or milling suitable thermoplastic polymers, by controlled precipitation from solution, or by high shear dispersion of molten polymer in a nonsolvent followed by cooling and drying. In many cases, a classification process may be necessary to obtain optimum particle size of the material.

The thermoplastic polystyrene-type particulate polymers useful in these pastes are made from monovinylidene aromatic monomers either alone or in combination with one or more comonomers. By "monovinylidene aromatic monomer" it is meant that to an aromatic ring in each molecule of the monomer is attached one radical of the formula:

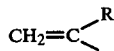

wherein R is hydrogen, lower alkyl (e.g., having 1-4 carbon atoms such as methyl, ethyl, n-propyl, n-butyl and isobutyl). Examples of such monovinylidene aromatic monomers include styrene, alpha-methylstyrene, ar-methylstyrene, ar-methoxystyrene, ar-hydroxymethylstyrene, ar-butylstyrene, ar,ar-dimethylstyrene, ar-chlorostyrene, ar,ar-dichlorostyrene, and ar-ethylstyrene.

Comonomers with the above monovinylidene aromatic monomers may include one or more addition polymerizable compounds such as the saturated esters of ethylenically unsaturated carboxylic acids, including acrylate-type monomers, which class is here taken to include acrylates, methacrylates, acrylonitrile and methacrylonitrile including methyl methacrylate, ethyl methacrylate, butyl methacrylate, isobutyl methacrylate, methyl acrylate, ethyl acrylate, butyl acrylate, and the like; ethylenically unsaturated esters of carboxylic acids, such as vinyl benzoate, vinyl toluene, and the like; and other copolymerizable vinylic and conjugated aliphatic diene monomers.

Monomers which tend to increase the film-forming properties of the polymer may be included, but not to such an extent that the polymer tends to fuse under conditions of paste preparation by lowering the glass transition temperature below about 50° C. Examples of such monomers include 1,3-butadiene, isoprene, lauryl methacrylate and stearyl methacrylate.

Other comonomers may be included if they do not interfere with the operation of the invention. It may be desirable to include certain additional polymer components to facilitate the preparation of particles of appropriate size. U.S. Pat. No. 3,853,579 discloses the inclusion of up to 25% by weight of ethylenically unsaturated carboxylic acids which apparently aid in stabilizing the dispersion of the polymer during aqueous polymerization. Such monomers may be used in the thermoplastic polymers of the present heat fusible pastes. These ethylenically unsaturated carboxylic acids may be mono- or polycarboxylic acids such as acrylic acid, methacrylic acid, itaconic acid, fumaric acid, maleic acid and anhydride, citraconic acid and anhydride and other such acids.

The preferred thermoplastic polystyrene-type polymers useful in the pastes of this invention are comprised of at least 51% monovinylidene aromatic monomer, preferably selected from styrene, alpha-methylstyrene, p-methylstyrene and chlorostyrene. Preferred comonomers include methyl acylate, ethyl acrylate, butyl acrylate, 2-ethylhexyl acrylate, methyl methacrylate, ethyl methacrylate, butyl methacrylate, isobutyl methacrylate, lauryl methacrylate, stearyl methacrylate, acrylonitrile, and 1,3-butadiene.

The polyacrylate-type polymers used in the pastes of this invention are based on acrylic monomers including alkyl acrylates, alkyl methacrylates, acrylonitrile and methacrylonitrile either alone or in combination with one or more comonomers with at least 51% of the monomers being one or more of said acrylic monomers. The alkyl acrylate and methacrylate monomers which are suitable constituents of the thermoplastic polyacrylate-type polymers useful in the pastes of this invention include methyl acrylate, ethyl acrylate, butyl acrylate, 2-ethylhexyl acrylate, methyl methacrylate, ethyl methacrylate, butyl methacrylate, and isobutyl methacrylate. Of the above acrylate-type monomers, methyl methacrylate and acrylonitrile are preferred.

Comonomers other than acrylic monomers which may be used include one or more of the above described monovinylidene aromatic monomers, other saturated esters of ethylenically unsaturated carboxylic acids, ethylenically unsaturated esters of carboxylic acids and other copolymerizable vinylic and conjugated aliphatic diene monomers as described above. Other comonomers may be included if they do not interfere with the operation of the invention, for example, comonomers introduced to aid in stabilization during emulsion polymerization.

Thermoplastic polyacrylate-type polymer particles of a size useful in this invention can be conveniently obtained in evaporating the diluent from emulsion or dispersion polymerized systems, as described in *Dispersion Polymerization In Organic Media*, edited by K. E. J. Barrett (John Wiley & Sons, NY, 1975). Alternatively, particles may be prepared by grinding or milling the polymers, by controlled precipitation from solution. In many cases, a particle size classification process may be necessary to obtain the optimum size of the material.

The continuous soft resinous phase of the paste is comprised of a tackifying, cohesion-increasing material which may be a resin or mixture of resins with a softening point at or below room temperature, or which has been diluted with an oil to suitably lower the softening point. The term "resin" is here restricted to amorphous organic solids, semi-solids and viscous liquids with room temperature viscosities above about 2000 centipoise. Such resins are commonly polymeric, but number average molecular weight must be under about 5000. Typical classes of resins which may be used are hydrocarbon resins, including naturally occuring coal tar and other fossil resins, synthetic aliphatic and aromatic hydrocarbon resins prepared from petroleum- or coal-derived feedstocks, and resins based on pure hydrocarbon monomers and combination of monomers, such as styrene and alkyl-substituted styrenes, indene and dicyclopentadiene; terpene resins; rosin and rosin esters such as hydrogenated methyl ester of rosin and phenolic modified pentaerythritol ester of rosin; ketone formaldehyde thermoplastic resins; condensed ketone thermoplastic resins; and resins based on acrylate esters and alkyl substituted acrylate esters; and transesterification products of alcohols with dimethyl terephthalate process residues.

Diluent oils may be aliphatic, aromatic, or naphthenic in character, and may contain polar functionality, but must be compatible with and dissolve in the resin system. Typically, they have solubility parameters between about 7.0 and 8.5. They must be substantially nonvolatile at the temperature at which the ink is set, typically 150° C. or higher. It is important to choose diluents which do not rapidly solvate the particulate thermoplastic phase at room temperature. This may be accomplished by avoiding those diluent oils which closely match the solubility parameter of the particulate thermoplastic. Typically the solubility parameter midpoint for polystyrene with respect to weakly hydrogen-bonded solvents such as hydrocarbon oils or chlorinated hydrocarbons is at or about 9.3, and with respect to moderately hydrogen-bonded solvents such as esters or ketones, it is at or about 9.0. Polystyrene is insoluble in strongly hydrogen-bonding solvents. The solubility parameter midpoint for poly(methyl methacrylate) with respect to weakly hydrogen-bonded solvents such as hydrocarbon oils or chlorinated hydrocarbons is typically about 10.8, and with respect to moderately hydrogen-bonded solvents such as esters or ketones about 10.9. Poly(methyl methacrylate) is insoluble in strongly hydrogen-bonded solvents. Liquid plasticizers of the sort typically used to prepare polyvinyl chloride plastisols (commonly referred to as "primary plasticizers") such as those disclosed by Ludlow in U.S. Pat. No. 3,924,213, have solubility parameters between about 8.5 and 11 and are not used in the pastes of this invention.

There is no such restriction on the solubility parameter of the resin itself. The rate of solvation is slow enough that even inks containing resins which closely match the solubility parameter of the particulate thermoplastic may be prepared and run on a press. In extreme cases, solvation may proceed at a rate that would limit certain combinations of resin and thermoplastic polymers to applications where inks are prepared as needed, and are not stored longer than a day or so. Printing inks are commonly prepared as needed in larger printing plants. Under such circumstances, the chemical composition of the particulate thermoplastic polymers and the resin may be essentially identical, the materials differing only in physical form and molecular weight, for example, particulate polystyrene dispersed in a soft resinous phase consisting in part of polystyrene resin.

The glassy thermoplastic polymer and soft resin of this invention should be used in proportions such that the ratio of polymer to resin will preferably be between about 1:6 and about 1:1. Also, the ratio of soft resin to diluent oil may range from those cases in which the formulation is oil-free (i.e. where the soft resin is naturally thin enough to achieve the desired rheology in the final fusible paste formulation) to about a 1:15 ratio of resin to oil.

The primary mechanism by which the pastes of this invention set appears to be the fusion of the particulate thermoplastic binder to form a continuous film on heating the paste, in which the soft resinous phase is largely dissolved and/or entrapped. In some circumstances, it may be desirable for the paste film to harden further. This can be achieved by choosing for the soft resinous phase, either in whole or part, materials capable of undergoing polymerization or cross-linking during the thermal fusion of the particulate thermoplastic material or subsequent to it. In such cases, it may be appropriate to include suitable catalysts, driers, accelerators, or other additives which are necessary or desirable to initiate or promote the desired polymerization or cross-linking reaction. Such subsequent hardening of the thermally set paste film may be achieved by including one or more unsaturated alkyd resins as part of the resinous phase, such as alkyds based on phthalic, isophthalic, adipic, azelaic, sebacic, terephthalic, hydrophthalic, maleic, fumeric, and benzoic acids and anhydrides modified with unsaturated fatty acids; rosin modified alkyds; phenolic modified alkyds; epoxy alkyds; polyamide alkyds; isocyanate alkyds; and styrene or substituted styrene alkyds, such as styrene and acrylonitrile modified alkyds. The unsaturated isophthalic alkyds are preferred.

Similarly, drying oils or semi-drying oils such as linseed oil, tung oil, oiticica oil, dehydrated castor oil, soya oil, safflower oil, fish oil, tall oil, or the like may be used as hardening agents in the resinous phase. These oils may be used in the natural state or may be bodied to increase viscosity by heating or other partial polymerization.

When such oxidation drying materials are included in the paste, suitable driers or catalysts which promote oxidative cross-linking and polymerization may be included, typically salts or complexes of metals capable of existing in more than one valence state, such as vanadium oxyacetylacetonate, vanadium oxysulfate, vanadium oxy-1,1,1-trifluoroacetylacetonate, vanadium oxy-1-phenylacetylacetonate, ferric acetylacetonate-benzoin, manganese octoate, lead naphthenate, cobaltic acetylacetonate, titanyl acetylacetonate, cobaltous naphthenate, cobaltous 2-ethylhexanoate, cobaltous stearate, cobaltic stearate, cobaltous acetylacetonate, manganous stearate, manganic stearate, manganous acetylacetonate, manganic acetylacetonate, manganese naphthenate, zirconium acetylacetonate, vanadyl naphthenate, ferrous sulfate, ferrous pyrophosphate, ferrous sulfide, the ferrous complex of ethylenedinitrilotetra-acetic acid, ferrous o-phenanthroline, ferrous ferrocyanide, ferrous acetylacetonate and the corresponding nickel, copper, mercury and chromium compounds.

In addition to the above-described essential ingredients, when the pastes are used as printing inks surface active agents, pigment dispersing aids, waxes, slip aids, tack modifiers and the like may be included.

The use of a colorant is not critical to the invention. The fusible paste dispersions can be used unpigmented as a clear overprint varnish. When a colorant is desired, it may be a pigment or dye. The colorant normally may be most conveniently dispersed in the continuous soft resinous phase of the ink. However, it may be desirable in some circumstances to include the colorant within the particulate thermoplastic material.

When used as printing inks, the pastes of this invention may be printed by any of the printing processes which require a paste type ink. Common printing processes in which paste inks are used include letterpress, lithography, and screen printing. Printing may be sheet-fed or web-fed, and may be on paper, board, fabric, metal, glass, plastic, wood, leather, rubber, or other substrates. Variations in ink rheology and tack properties are required for optimum performance for any chosen printing process and substrate. Inks based on the pastes of this invention can be suitably formulated to meet these specific requirements by appropriate choice and relative concentration of materials used in the resinous phase. This will be readily apparent to those skilled in printing ink formulation.

In addition to printing, pastes may be applied to substrates by roll-coating, doctoring, screening, dipping, or the like, especially for the preparation of speciality coatings or for use as heat-set thermoplastic adhesives. Self supporting shapes may be prepared by cavity molding, dip molding, rotational molding, slush molding or the like. Variations in paste rheology and tack properties are required for optimum performance for any chosen fabrication process. The pastes can be formulated to meet these requirements by appropriate choice and relative concentration of materials used in the resinous phase. This will be readily apparent to those skilled in the art of materials fabrication.

After printing, coating, or forming, the pastes of this invention may be set by heating to at least about 75° C. and preferably to at least about 150° C. to fuse the particulate, glassy thermoplastic resin. This may be done in a conventional forced-air drying oven, in common use in the printing industry. However, since no air flow is necessary to remove volatile material, it is frequently advantageous to heat the paste film by irradiation, typically in the infrared spectral region. At 150° C., the paste may be fused by heating for from about 0.01 seconds to about 2 minutes, longer times being required for those pastes which do not contain pigments than for those which do contain pigment. Also, the duration of the heating may vary depending upon the thickness of the paste coating, substrate, or purpose for which the paste is used (e.g. adhesive, molding material, etc.).

EXAMPLE 1

A finely divided polystyrene with a particle size averaging about 0.5 micron and with a molecular weight of about 1 million is obtained by evaporating at room temperature the water from a commercially available polystyrene dispersion which is sold for use as a paper coating pigment. The soft resinous and diluent phases of the ink are combined with the polystyrene and pigment using a Hoover Automatic Muller achieving a uniform paste. The final composition is:

| Ingredients | Parts By Weight |
| --- | --- |
| Polystyrene | 100 |
| Hydrocarbon resin - largely aromatic; based on petroleum- and coal-derived monomers with a ring and ball softening point of 10° C., and a number average molecular weight below 5000. | 260 |
| Extending oil - petroleum derived; solubility parameter of about 7.8; less than 0.1% volatility at 150° C. | 40 |
| Carbon black | 40 |

The ink is printed on paper on a lithographic offset press. The printed sheets are passed at about 45 meters/min. under a 100 watt/cm infrared lamp with a peak output of about 1 micron (model 5193-5 line heater manufactured by Research Incorporated, Minneapolis, Minn., operated at 230 volts) at a distance of 2.5 cm from the lamp reflector edge which results in the rapid setting of the ink film. After setting, the ink is dry and resistant to smudging or smearing.

EXAMPLE 2

An ink is prepared as in Example 1 with the following formulation:

| Ingredients | Parts By Weight |
| --- | --- |
| Polystyrene | 100 |
| Hydrocarbon resin - largely aromatic; based on petroleum and coal-derived monomers with a ring and ball softening point of 10° C., and a number average molecular weight below 5000. | 160 |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 100 |
| Carbon black | 36 |

The ink is printed and set as in Example 1. After setting, the ink is dry and resistant to smudging or smearing.

EXAMPLE 3

An ink is prepared as in Example 1. The formulation is identical except a polystyrene with a particle size averaging about 0.6 to 0.8 micron and with a molecular weight of about 1 million is used which was obtained by evaporating at room temperature the water from a commercially available polystyrene dispersion sold for use as a paper coating pigment. The ink is printed and set as in Example 1. After setting, the ink is dry and is resistant to smearing and smudging.

EXAMPLE 4

An ink is prepared as in Example 1. The formulation is identical except a polystyrene with an average particle size of about 0.2 micron and a molecular weight of about 1 million is used which was obtained by evaporating at room temperature the water from a commercially available polystyrene dispersion sold for use as a paper coating pigment. The ink is printed and set as in Example 1. After setting, the ink is dry and is smudge- and smear-resistant.

EXAMPLE 5

An ink is prepared as in Example 1. The final formulation is:

| Ingredients | Parts By Weight |
| --- | --- |
| Polystyrene | 100 |
| Hydrocarbon resin - based principally on alpha-methyl styrene and styrene; ring and ball softening point 25° C., and with a number average molecular weight below 5000. | 160 |
| Extending oil - petroleum derived; solubility parameter about 7.8; less than 0.1% volatility at 150° C. | 80 |
| Carbon black | 34 |

The ink is printed and set as in Example 1. After setting, the ink is dry and resistant to smudging and smearing.

EXAMPLE 6

An ink is prepared as in Example 1 with the following formulation:

| Ingredient | Parts By Weight |
| --- | --- |
| Polystyrene | 100 |
| Hydrocarbon resin - largely aliphatic; based on petroleum-derived monomers with a ring and ball softening point of 10° C. and a number average molecular weight below 5000. | 160 |
| Extending Oil - petroleum-derived; solubility parameter about 7.8; less than 0.1% volatility at 150° C. | 50 |
| Carbon black | 31 |

The ink is printed and set as in Example 1. After setting, the ink is dry and smudge- and smear-resistant.

EXAMPLE 7

An ink was prepared as in Example 1 with the following formulation:

| Ingredient | Parts By Weight |
| --- | --- |
| Polystyrene | 100 |
| Methyl ester of rosin with a viscosity of about 2700 centipoise | 160 |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 40 |
| Carbon black | 30 |

The ink is printed and set as in Example 1. After setting, the ink is dry and resistant to smearing and smudging.

EXAMPLE 8

The ink is prepared as in Example 1 having the following formulation:

| Ingredient | Parts By Weight |
| --- | --- |
| Polystyrene | 100 |
| Hydrocarbon resin - largely aromatic, based on petroleum- and coal-derived monomers with a ring and ball softening point of 10° C. and a number average molecular weight below 5000. | 160 |
| Ink varnish - phenolic-modified pentaerythritol ester of rosin dissolved in long oil linseed isophthalic alkyd in a weight ratio of 20:80 and less than 0.1% volatility at 150° C. | 100 |
| Carbon black | 40 |

The ink is printed and set as in Example 1. After setting, the ink is dry and resistant to smudging and smearing.

EXAMPLE 9

An ink is prepared as in Example 1 with the following formulation:

| Ingredients | Parts By Weight |
| --- | --- |
| Polystyrene | 100 |
| Hydrocarbon resin - largely aromatic; based on petrolem- and coal-derived monomers with a ring and ball softening point of 10° C. and a number average molecular weight below 5000. | 80 |
| Hydrocarbon resin - largely aromatic; based on petroleum- and coal-derived monomers; ring and ball softening point 25° C. | 40 |
| Radiant fluorescent chartreuse pigment (Hercules Incorporated) | 95 |

The ink is printed and set as described in Example 1. After setting, the ink is dry and resistant to smudging and smearing.

EXAMPLE 10

An ink is prepared as in Example 1 having the following formulation:

| Ingredients | Parts By Weight |
| --- | --- |
| Polystyrene | 100 |
| Hydrocarbon resin - largely aromatic; based on petroleum - and coal-derived monomers with a ring and ball softening point of 10° C. and a number average molecular weight below 5000. | 180 |
| Extending oil - petroleum derived; solubility parameter of about 7.8; less than 0.1% volatility at 150° C. | 20 |
| Titanium dioxide | 15 |

The ink is screen printed onto glass and set by oven heating for 2 minutes at 135° C. The resulting film is dry and scratch resistant.

EXAMPLE 11

The ink of Example 1 is screen printed onto cotton fabric. The ink is set by IR radiation as in Example 1. The cotton fabric is laundered in an automatic washing machine with a detergent with no loss of image.

EXAMPLE 12

A paste is prepared as in Example 1 with the following formulation:

| Ingredients | Parts By Weight |
|---|---|
| Polystyrene | 120 |
| Hydrocarbon resin - largely aromatic; based on petroleum- and coal-derived monomers with a ring and ball softening point of 10° C. and a number average molecular weight below 5000. | 160 |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 100 |

The paste is printed as an overprint varnish on a lithographic offset press. The printed sheets are heated to 200° C. for 2 minutes in a forced air oven. After setting, the coating is dry and smudge resistant.

EXAMPLE 13

A paste is prepared as in Example 1 with the following formulation:

| Ingredients | Parts By Weight |
|---|---|
| Polystyrene | 100 |
| Hydrocarbon resin - largely aromatic; based on petroleum- and coal-derived monomers with a ring and ball softening point of 10° C. and a number average molecular weight below 5000. | 100 |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 80 80 |
| Extending oil - petroleum derived; solubility parameter of about 7.8; less than 0.1% volatility at 150° C. | 20 |
| Titanium dioxide | 14 |

The paste is roll-coated onto paper and heated by passing under an IR lamp, which results in rapid setting of the paste film. After setting, the coating is dry and resistant to smearing.

EXAMPLE 14

A paste is prepared as in Example 1 with the following formulation:

| Ingredients | Parts By Weight |
|---|---|
| Polystyrene | 100 |
| Hydrocarbon resin - largely aliphatic; based on petroleum-derived monomers with a ring and ball softening point of 10° C. and a number average molecular weight below 5000. | 160 |

The paste is blade-coated onto a Bonderite 100 treated cold rolled steel panel. The coated panel is heated for five minutes in a forced-air oven at 175° C. On cooling, the resulting coating is dry and rub-resistant.

EXAMPLE 15

The paste of Example 14 is doctored onto two pieces of bleached poplin. The coated fabrics are pressed together with an iron at 120° C. for under one minute. On cooling, a strong fabric-to-fabric bond results.

EXAMPLE 16

The paste of Example 14 is pressed into a metal mold which had previously been coated with a mold release. The filled mold is placed in an oven at 200° C. for 10 minutes. On cooling, the resulting molded object is removed from the mold and has accurately replicated the design of the mold cavity.

EXAMPLES 17-22

Copolymers of the following compositions are prepared by emulsion polymerization. The resulting particle size is about 0.5 micron and the molecular weight about 500,000.

| Example | Comonomer Ratio | | Approximate Glass Transition Temperature, °C. |
|---|---|---|---|
| 17 | Sytrene | 60% | 100 |
| | Methyl methacrylate | 40% | |
| 18 | Styrene | 90% | 100 |
| | Methyl methacrylate | 10% | |
| 19 | Styrene | 95% | 90 |
| | Ethyl acrylate | 5% | |
| 20 | Styrene | 95% | 85 |
| | Lauryl methacrylate | 5% | |
| 21 | Styrene | 90% | 85 |
| | Methyl methacrylate | 5% | |
| | Lauryl methacrylate | 5% | |
| 22 | Styrene | 70% | 100 |
| | Acrylonitrile | 30% | |

The particulate thermoplastic polymers are isolated by evaporating the water from the emulsions. Inks are prepared from each as described in Example 1 using the following formulation:

| Ingredients | Parts By Weight |
|---|---|
| Particulate polymer | 100 |
| Hydrocarbon resin - largely aromatic; based on petroleum- and coal-derived monomers with a ring and ball softening point of 10° C. and a number average molecular weight below 5000. | 260 |
| Extending oil - petroleum derived; solubility parameter of about 7.8; less than 0.1% volatility at 150° C. | 40 |
| Carbon black | 40 |

Each ink is printed and set as in Example 1. After setting, each ink is dry and resistant to smudging and smearing.

EXAMPLE 23

An ink is prepared as in Example 1 with the following formulation:

| Ingredients | Parts By Weight |
|---|---|
| Polystyrene | 100 |
| Resin-transesterification products of 2-ethylhexanol with dimethyl terephthalate process residue largely comprising methyl and benzyl esters of biphenyldicarboxylic and tricarboxylic acids with a viscosity above 2000 centipoise and a number average molecular weight below 5000. | 160 |
| Carbon black | 26 |

The ink is printed on a lithographic press and on a Van der Cook proofing press and prints are set by passing under an IR lamp as described in Example 1. After setting, the ink is dry and smudge-resistant.

EXAMPLE 24

A fusible paste ink is prepared with the following composition:

| Ingredients | Parts By Weight |
| --- | --- |
| Polystyrene | 100 |
| Hydrogenated methyl ester of rosin with a viscosity of about 5500 centipoise | 240 |
| Phenolic-modified pentaerythritol ester of rosin | 20 |
| Carbon black | 40 |

The ink is prepared by (1) dissolving the phenolic modified pentaerythritol ester of rosin in the hydrogenated methyl ester of rosin; (2) dispersing the polystyrene in about two-thirds of the above solution on a three roll mill; (3) dispersing the carbon black in the remaining one-third of the resin solution on a three roll mill; and (4) blending the two dispersions together with a light mixing pass on a three roll mill.

The ink is printed on a Little Joe press. Prints are set by placing in an oven at 150° C. for 90 seconds, in an oven at 200° C. for 30 seconds and on a curved hot plate at 288° C. for 3 seconds.

EXAMPLE 25

A paste is prepared as in Example 24 with the omission of the carbon black. The paste is used as an overprint varnish by printing on a sheet-fed lithographic press. The resulting clear coating is set by placing in an oven at 150° C. for 90 seconds.

EXAMPLE 26

A finely divided poly(methyl methacrylate) with a particle size averaging about 1 micron and with a molecular weight of about 100,000 is obtained by evaporating the heptane from a heptane dispersion obtained by inverse emulsion polymerization. The poly(methyl methacrylate) and a pigment are dispersed in a mixture of resins and diluents using a Hoover Automatic Muller, achieving a uniform paste. The final composition is:

| Ingredients | Parts By Weight |
| --- | --- |
| Poly(methyl methacrylate) | 100 |
| Hydrocarbon resin - largely aromatic; based on petroleum- and coal-derived monomers with a ring and ball softening point of 10° C. and a number average molecular weight below 5000. | 125 |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 75 |
| Extending oil - petroleum derived; solubility parameter of about 7.8; less than 0.1% volatility at 150° C. | 25 |
| Carbon black | 25 |
| Iron blue pigment | 5 |

The ink is printed on paper on a lithographic offset press and performs well. The printed sheets are passed at speeds in excess of 76 meters/minute under a 100 watt/cm infrared lamp with a peak output of about 1 micron (model 5193-5 line heater manufactured by Research Incorporated, Minneapolis, Minn., operated at 230 volts) at a distance of about 2.5 cm from the lamp reflector edge, which results in rapid setting of the ink film. After setting, the prints are smudge-resistant as judged by the Sutherland Ink Rub Tester (Sutherland Paper Co., Kalamazoo, Mich.) with a 1712 gram weight for ten rub cycles.

EXAMPLE 27

An ink is prepared as in Example 26 with the following formulation:

| Ingredients | Parts By Weight |
| --- | --- |
| Poly(methyl methacrylate) | 100 |
| Hydrocarbon resin - largely aromatic; based on petroleum- and coal-derived monomers with a ring and ball softening point of 10° C. and a number average molecular weight below 5000. | 150 |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 75 |
| Carbon black | 25 |
| Iron blue pigment | 5 |

The ink is printed and set as in Example 26 with the same results.

EXAMPLE 28

An ink is prepared as in Example 26 with the following formulation:

| Ingredients | Parts By Weight |
| --- | --- |
| Poly(methyl methacrylate) | 100 |
| Hydrocarbon resin - largely aromatic; based on petroleum- and coal-derived monomers with a ring and ball softening point of 10° C. and a number average molecular weight below 5000. | 260 |
| Extending oil - petroleum derived; solubility parameter of about 7.8; less than 0.1% volatility at 150° C. | 40 |
| Carbon black | 40 |

The ink is printed and set as in Example 26. After setting, the ink is dry and smudge-resistant.

EXAMPLE 29

An ink is prepared as in Example 26 having the formulation:

| Ingredients | Parts By Weight |
| --- | --- |
| Poly(methyl methacrylate) | 100 |
| Hydrocarbon resin - based principally on alpha-methyl styrene and styrene; ring and ball softening point of 25° C. and a number average molecular weight below 5000. | 160 |
| Extending oil - petroleum derived; solubility parameter of about 7.8; less than 0.1% volatility at 150° C. | 80 |
| Carbon black | 34 |

The ink is printed and set as in Example 26. After setting, the ink is dry and smudge-resistant.

EXAMPLE 30

An ink is prepared as in Example 26 having the formulation:

| Ingredients | Parts By Weight |
|---|---|
| Poly(methyl methacrylate) | 100 |
| Hydrocarbon resin - largely aliphatic; based on petroleum-derived monomers with a ring and ball softening point of 10° C. and a number average molecular weight below 5000. | 160 |
| Extending oil - petroleum derived; solubility parameter of about 7.8; less than 0.1% volatility at 150° C. | 50 |
| Carbon black | 31 |

The ink is printed and set as in Example 26. After setting, the ink is dry and resistant to smudging.

EXAMPLE 31

An ink is prepared as in Example 26 with the following formulation:

| Ingredients | Parts By Weight |
|---|---|
| Poly(methyl methacrylate) | 100 |
| Methyl ester of rosin with a viscosity of about 2700 centipoise | 160 |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 40 |
| Carbon black | 30 |

The ink is printed and set as in Example 26. The ink is dry and smudge-resistant after setting.

EXAMPLE 32

An ink is prepared as in Example 26 having the following composition:

| Ingredients | Parts By Weight |
|---|---|
| Poly(methyl methacrylate) | 100 |
| Hydrocarbon resin - largely aromatic, based on petroleum- and coal-derived monomers with a ring and ball softening point of 10° C. and a number average molecular weight below 5000. | 160 |
| Ink varnish - phenolic-modified pentaerythritol ester of rosin dissolved in long oil linseed isophthalic alkyd in a weight ratio of 40:60 and less than 0.1% volatility at 150° C. | 20 |
| Carbon black | 28 |

The ink is printed and set as in Example 26 with the same results.

EXAMPLE 33

An ink is prepared as in Example 26 having the formulation:

| | |
|---|---|
| Poly(methyl methacrylate) | 100 |
| Hydrocarbon resin - largely aromatic; based on petroleum- and coal-derived monomers with a ring and ball softening point of 10° C. and a number average molecular weight below 5000. | 80 |
| Hydrocarbon resin - largely aromatic; based on petroleum- and coal-derived monomers with a ring and ball softening point of 25° C. and a number average molecular weight below 5000. | 40 |
| Radiant fluorescent chartreuse pigment (Hercules Incorporated) | 95 |

The ink is printed and set as in Example 26. After setting, the ink is smudge-resistant and dry.

EXAMPLE 34

An ink is prepared as in Example 26 with the following formulation:

| | |
|---|---|
| Poly(methyl methacrylate) | 100 |
| Hydrocarbon resin - largely aromatic; based on petroleum- and coal-derived monomers with a ring and ball softening point of 10° C. and a number average molecular weight below 5000. | 180 |
| Extending oil - petroleum derived; solubility parameter of about 7.8; less than 0.1% volatility at 150° C. | 20 |
| Titanium dioxide | 15 |

The ink is screen printed onto glass and set by heating in an oven for 2 minutes at 135° C. The resulting ink film is dry and scratch-resistant.

EXAMPLE 35

The ink of Example 26 is screen printed onto cotton fabric and set by IR exposure as in Example 27. The cotton fabric is laundered in an automatic washing machine with a detergent with no loss of image.

EXAMPLE 36

A paste is prepared as in Example 26 with the following formulation:

| Ingredient | Parts By Weight |
|---|---|
| Poly(methyl methacrylate) | 120 |
| Hydrocarbon resin - largely aromatic; based on petroleum- and coal-derived monomers with a ring and ball softening point of 10° C. and a number average molecular weight below 5000. | 160 |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 100 |

The paste is printed as an overprint varnish on a lithographic offset press. The printed sheets are heated to 200° C. for 2 minutes in a forced air oven. After setting, the coating is dry and smudge-resistant.

EXAMPLE 37

A paste is prepared as in Example 26 with the following formulation:

| Ingredients | Parts By Weight |
|---|---|
| Poly(methyl methacrylate) | 100 |
| Hydrocarbon resin - largely aromatic; based on petroleum- and coal- | 100 |

| Ingredients | Parts By Weight |
|---|---|
| derived monomers with a ring and ball softening point of 10° C. and a number average molecular weight below 5000. | |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 80 |
| Extending oil - petroleum derived; solubility parameter of about 7.8; less than 0.1% volatility at 150° C. | 20 |
| Titanium dioxide | 14 |

The paste is roll-coated onto paper and heated by passing under an IR lamp, resulting in rapid setting of the ink film. After setting, the coating is dry and resistant to smearing.

EXAMPLE 38

A paste is made as in Example 26 with the following formulation:

| Ingredients | Parts By Weight |
|---|---|
| Poly(methyl methacrylate) | 100 |
| Hydrocarbon resin - largely aliphatic, based on petroleum-derived monomers with a ring and ball softening point of 10° C. and a number average molecular weight below 5000. | 160 |
| Carbon black | 22 |

The paste is blade-coated onto a Bonderite 100 treated cold rolled steel panel. The coated panel is heated for five minutes in a forced-air oven at 175° C. On cooling, the resulting coating is dry and rub-resistant.

EXAMPLE 39

The paste of Example 38 is doctored onto two pieces of bleached poplin. The coated fabrics are pressed together with an iron at 120° C. for under one minute. On cooling, a strong fabric-to-fabric bond results.

EXAMPLE 40

The paste of Example 38 is pressed into a metal mold which had previously been coated with a mold release. The filled mold is placed in an oven at 200° C. for 10 minutes. On cooling, the resulting molded object is removed from the mold and has accurately replicated the design of the mold cavity.

EXAMPLE 41

An ink is prepared as in Example 26 having the formulation:

| Ingredients | Parts by Weight |
|---|---|
| Poly(methyl methacrylate) | 100 |
| Hydrocarbon resin - largely aromatic; based on petroleum- and coal-derived monomers with a ring and ball softening point of 10° C. and a number average molecular weight below 5000. | 160 |
| Carbon black | 26 |

The ink is printed on paper with a lithographic printing press and a Van der Cook proofing press. The prints are set by passing under an IR lamp as in Example 26. After setting, the ink is dry and smudge-resistant.

EXAMPLE 42

An ink is prepared as in Example 26 with the following composition:

| Ingredients | Parts By Weight |
|---|---|
| Poly(methyl methacrylate) | 100 |
| Hydrogenated methyl ester of rosin with a viscosity of about 5500 centipoise | 240 |
| Phenolic modified pentaerythritol ester of rosin | 20 |
| Carbon black | 40 |

The ink is printed and set as in Example 26. After setting, the ink is dry and resistant to smudging.

EXAMPLES 43–48

Polymers and copolymers of the following compositions are prepared by emulsion polymerization. The resulting particle size is about 0.5 micron and the molecular weight about 500,000.

| Example | Comonomer Ratio | | Approximate Glass Transition Temperature, °C. |
|---|---|---|---|
| 43 | Methyl methacrylate | 60% | >105 |
| | Styrene | 40% | |
| 44 | Methyl methacrylate | 60% | >105 |
| | Acrylonitrile | 40% | |
| 45 | Methyl methacrylate | 80% | 80 |
| | Methyl acrylate | 20% | |
| 46 | Methyl methacrylate | 45% | 100 |
| | Acrylonitrile | 20% | |
| | Styrene | 35% | |
| 47 | Acrylonitrile | 60% | 93 |
| | Styrene | 40% | |
| 48 | Acrylonitrile | 100% | >105 |

Each of the above thermoplastic polymers is isolated as powders by evaporating the water from the emulsion. Inks are prepared from each of the above polymers as described in Example 26 with the following formulation:

| Ingredients | Parts By Weight |
|---|---|
| Particulate thermoplastic polymer | 100 |
| Hydrocarbon resin - largely aromatic; based on petroleum- and coal-derived monomers with a ring and ball softening point of 10° C. and a number average molecular weight below 5000. | 150 |
| Ink varnish - phenolic-modified pentaerythritol ester of rosin dissolved in alkali-refined linseed oil with a solubility parameter of about 7.8 in a weight ratio of 40:60 and less than 0.1% volatility at 150° C. | 75 |
| Carbon black | 25 |
| Iron blue pigment | 5 |

Each ink so produced is printed and set as in Example 26. After setting, each ink is dry and smudge-resistant.

What I claim and desire to protect by Letters Patent is:

1. A composition of matter in paste form comprising discrete solid particles of a glassy thermoplastic polymeric material, said polymeric material having been prepared from at least 51% of at least one monomer selected from the group consisting of acrylate-type monomers and monovinylidene aromatic monomers, said polymeric material having a glass transition temperature of at least about 50° C., and a particle diameter between about 0.05 micron and about 50 microns, said discrete solid particles of polymeric material being dispersed in a tackifying, cohesion-increasing material whose softening point is at or below room temperature, said polymeric material and said cohesion-increasing material being present in said composition in a ratio of polymeric material to cohesion-increasing material of between about 1:6 to about 1:1.

2. The composition of claim 1 wherein the glassy thermoplastic polymer is polystyrene.

3. The composition of claim 1 wherein the glassy thermoplastic polymer is poly(methyll methacrylate).

4. The composition of claim 1 wherein the tackifying, cohesion-increasing material comprises a resin or mixture of resins whose softening point is at or below room temperature.

5. The composition of claim 1 wherein the tackifying cohesion-increasing material comprises a mixture of at least one resin and at least one diluent oil as a softening point lowering agent, the ratio of said resin to said oil being from about 1:0 to about 1:15.

6. The composition of claim 5 wherein the diluent oil has a solubility parameter between about 7.0 and about 8.5.

7. The composition of claim 1 wherein the tackifying cohesion-increasing material is selected from a hydrocarbon resin, an ester of rosin and mixtures thereof.

8. The composition of claim 7 wherein the hydrocarbon resin is an aromatic hydrocarbon resin.

9. The composition of claim 7 wherein the ester of rosin is selected from a methyl ester of rosin, methyl ester of hydrogenated rosin, methyl ester of disproportionated rosin and esters and modified esters of rosin with polybasic alcohols.

10. The composition of claim 1 further comprising coloring material.

11. The composition of claim 1 further comprising at least one hardening agent selected from drying oils and unsaturated alkyds.

12. The composition of claim 11 wherein the hardening agent is selected from linseed oil, bodied linseed oil, and long oil isophthalic alkyd.

13. A printing ink in paste form comprising (1) a colorant, (2) discrete solid particles of a glassy thermoplastic polymeric material, said polymeric material having been prepared from at least 51% of at least one monomer selected from the group consisting of acrylate-type monomers and monovinylidine aromatic monomers, said polymeric material having a glass transition temperature of at least about 50° C. and a particle diameter between about 0.05 micron and about 50 microns, and (3) a tackifying cohesion-increasing material whose softening point is at or below room temperature, said polymeric material and said cohesion-increasing material being present in said printing ink in a ratio of polymeric material to cohesion-increasing material of between about 1:6 to about 1:1.

14. An adhesive composition in paste form comprising discrete solid particles of a glassy thermoplastic polymeric material, said polymeric material having been prepared from at least 51% of at least one monomer selected from the group consisting of acrylate-type monomers and monovinylidene aromatic monomers, said polymeric material having a glass transition temperature of at least about 50° C., and a particle diameter between about 0.05 micron and about 50 microns, said discrete solid particles of polymeric material being dispersed in a tackifying, cohesion-increasing material whose softening point is at or below room temperature, said polymeric material and said cohesion-increasing material being present in said composition in a ratio of polymeric material to cohesion-increasing material of between about 1:6 to about 1:1.

15. A molding material composition in paste form comprising discrete solid particles of a glassy thermoplastic polymeric material, said polymeric material having been prepared from at least 51% of at least one monomer selected from the group consisting of acrylate-type monomers and monovinylidene aromatic monomers, said polymeric material having a glass transition temperature of at least about 50° C., and a particle diameter between about 0.05 micron and about 50 microns, said discrete solid particles of polymeric material being dispersed in a tackifying, cohesion-increasing material whose softening point is at or below room temperature, said polymeric material and said cohesion-increasing material being present in said composition in a ratio of polymeric material to cohesion-increasing material of between about 1:6 to about 1:1.

16. A process comprising printing onto the surface of a substrate a composition in paste form comprising (1) a colorant, (2) discrete solid particles of a glassy thermoplastic polymeric material, said polymeric material having been prepared from at least 51% of at least one monomer selected from the group consisting of acrylate-type monomers and monovinylidene aromatic monomers, said polymeric material having a glass transition temperature of at least about 50° C. and a particle diameter between about 0.05 micron and about 50 microns, and (3) a tackifying cohesion-increasing material whose softening point is at or below room temperature, said polymeric material and said cohesion-increasing material being present in said composition in a ratio of polymeric material to cohesion-increasing material of between about 1:6 to about 1:1 and heating the printed surface of the substrate for a length of time at a temperature sufficient to fuse the composition.

17. The printing ink of claim 13 wherein the colorant is carbon black.

* * * * *

UNITED STATES PATENT AND TRADEMARK OFFICE
CERTIFICATE OF CORRECTION

PATENT NO. : 4,162,997
DATED : July 31, 1979
INVENTOR(S) : Robert M. Walsh

It is certified that error appears in the above–identified patent and that said Letters Patent are hereby corrected as shown below:

Col. 4, line 1 " toluene " should read -- toluate --.

Col. 11, Example 13 in the Table delete " 80 " second occurrence.

Signed and Sealed this

Twenty-third Day of October 1979

[SEAL]

*Attest:*

RUTH C. MASON
*Attesting Officer*

LUTRELLE F. PARKER
*Acting Commissioner of Patents and Trademarks*